(12) United States Patent
Connelly

(10) Patent No.: US 7,284,064 B1
(45) Date of Patent: *Oct. 16, 2007

(54) METHOD AND APPARATUS TO DETERMINE BROADCAST CONTENT AND SCHEDULING IN A BROADCAST SYSTEM

(75) Inventor: Jay H. Connelly, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/532,034

(22) Filed: Mar. 21, 2000

(51) Int. Cl.
*G06F 15/16* (2006.01)
*H04H 9/00* (2006.01)

(52) U.S. Cl. .......................... 709/231; 725/9
(58) Field of Classification Search .......... 709/231, 709/222, 226–228; 725/105, 63–66, 9, 14, 725/32–36, 46
See application file for complete search history.

(56) References Cited

U.S. PATENT DOCUMENTS

| | | |
|---|---|---|
| 5,075,771 A | 12/1991 | Hashimoto |
| 5,357,276 A | 10/1994 | Banker et al. |
| 5,410,344 A | 4/1995 | Graves et al. |
| 5,483,278 A | 1/1996 | Strubbe et al. |
| 5,534,911 A | 7/1996 | Levitan |

(Continued)

FOREIGN PATENT DOCUMENTS

| | | | |
|---|---|---|---|
| JP | 2003032710 A | * | 1/2003 |
| WO | WO 00/64165 | | 10/2000 |
| WO | WO 01/15449 A1 | | 3/2001 |
| WO | WO 01/15451 A1 | | 3/2001 |
| WO | WO 01/37123 A2 | | 5/2001 |

OTHER PUBLICATIONS

Scheduling policies for an VOD system over CATV networks, Ren-Hung Hwang; Jang-Jiin Wu, Global Telecommunications Conference, 1997. GLOBECOM '97., IEEE , vol. 1 , Nov. 3-8, 1997 pp. 438-442 vol. 1.*

(Continued)

*Primary Examiner*—Andrew Caldwell
*Assistant Examiner*—Douglas Blair
(74) *Attorney, Agent, or Firm*—Blakely, Sokoloff, Taylor & Zafman LLP

(57) ABSTRACT

A broadcast system, method and apparatus providing content on demand. In one embodiment, the disclosed broadcast system includes a server that broadcasts meta-data to a plurality of clients. The meta-data describes a plurality of data files that are to be broadcast or potentially broadcast later by the server. Each client receives the broadcasted meta-data from the server and updates and maintains a local meta-data table and a content rating table. Based on the meta-data, previous access habits of the user and optional user classifications, the client system selectively receives and/or stores the data files that are later broadcast by the server. In one embodiment, the client systems transmit back to the server ratings of each one of the data files described by the meta-data based on the user's previously accessed data files and optional user classifications. The server then determines the data files to be broadcast and the broadcast schedule based on the ratings received from the clients.

28 Claims, 9 Drawing Sheets

U.S. PATENT DOCUMENTS

| | | | |
|---|---|---|---|
| 5,559,549 A | 9/1996 | Hendricks et al. | |
| 5,568,181 A | 10/1996 | Greenwood et al. | |
| 5,583,576 A | 12/1996 | Perlman et al. | |
| 5,585,838 A | 12/1996 | Lawler et al. | |
| 5,619,249 A | 4/1997 | Billock et al. | |
| 5,648,824 A | 7/1997 | Dunn et al. | |
| 5,666,293 A | 9/1997 | Metz et al. | |
| 5,686,954 A * | 11/1997 | Yoshinobu et al. | 725/43 |
| 5,751,282 A | 5/1998 | Girard et al. | |
| 5,752,160 A | 5/1998 | Dunn | |
| 5,754,938 A | 5/1998 | Herz et al. | |
| 5,758,257 A | 5/1998 | Herz et al. | |
| 5,758,259 A | 5/1998 | Lawler | |
| 5,768,681 A | 6/1998 | Dan et al. | |
| 5,778,182 A | 7/1998 | Cathey et al. | |
| 5,790,935 A | 8/1998 | Payton | |
| 5,801,753 A | 9/1998 | Eyer et al. | |
| 5,848,396 A | 12/1998 | Gerace | |
| 5,867,226 A | 2/1999 | Wehmeyer et al. | |
| 5,867,799 A | 2/1999 | Lang et al. | |
| 5,920,700 A | 7/1999 | Gordon et al. | |
| 5,930,493 A | 7/1999 | Ottesen et al. | |
| 5,973,683 A * | 10/1999 | Cragun et al. | 345/719 |
| 5,978,381 A | 11/1999 | Perlman et al. | |
| 5,983,214 A | 11/1999 | Lang et al. | |
| 5,999,526 A | 12/1999 | Garland et al. | |
| 6,005,597 A | 12/1999 | Barrett et al. | |
| 6,018,768 A * | 1/2000 | Ullman et al. | 709/218 |
| 6,020,883 A * | 2/2000 | Herz et al. | 345/721 |
| 6,021,433 A | 2/2000 | Payne et al. | |
| 6,029,045 A | 2/2000 | Picco et al. | |
| 6,055,560 A | 4/2000 | Mills et al. | |
| 6,057,872 A | 5/2000 | Candelore | |
| 6,067,564 A | 5/2000 | Urakoshi et al. | |
| 6,075,971 A | 6/2000 | Williams et al. | |
| 6,088,722 A * | 7/2000 | Herz et al. | 709/217 |
| 6,108,645 A | 8/2000 | Eichstaedt et al. | |
| 6,125,259 A | 9/2000 | Perlman | |
| 6,160,989 A | 12/2000 | Hendricks et al. | |
| 6,177,931 B1 | 1/2001 | Alexander et al. | |
| 6,185,360 B1 | 2/2001 | Inoue et al. | |
| 6,271,893 B1 | 8/2001 | Kawaguchi et al. | |
| 6,279,040 B1 | 8/2001 | Ma et al. | |
| 6,298,482 B1 | 10/2001 | Seidman et al. | |
| 6,304,578 B1 | 10/2001 | Fluss | |
| 6,317,881 B1 * | 11/2001 | Shah-Nazaroff et al. | 725/24 |
| 6,324,182 B1 | 11/2001 | Burns et al. | |
| 6,349,321 B1 | 2/2002 | Katayama | |
| 6,357,042 B2 * | 3/2002 | Srinivasan et al. | 725/32 |
| 6,359,557 B2 | 3/2002 | Bilder | |
| 6,374,405 B1 | 4/2002 | Willard | |
| 6,378,036 B2 | 4/2002 | Lerman et al. | |
| 6,389,593 B1 | 5/2002 | Yamagishi | |
| 6,397,387 B1 | 5/2002 | Rosin et al. | |
| 6,434,747 B1 | 8/2002 | Khoo et al. | |
| 6,449,632 B1 * | 9/2002 | David et al. | 709/202 |
| 6,457,010 B1 | 9/2002 | Eldering et al. | |
| 6,460,036 B1 * | 10/2002 | Herz | 707/10 |
| 6,477,704 B1 * | 11/2002 | Cremia | 725/35 |
| 6,490,722 B1 * | 12/2002 | Barton et al. | 717/174 |
| 6,513,069 B1 * | 1/2003 | Abato et al. | 709/238 |
| 6,526,575 B1 | 2/2003 | McCoy et al. | |
| 6,529,526 B1 | 3/2003 | Schneidewend | |
| 6,557,042 B1 * | 4/2003 | He et al. | 709/231 |
| 6,563,515 B1 | 5/2003 | Reynolds et al. | |
| 6,601,237 B1 | 7/2003 | Ten Kate et al. | |
| 6,614,987 B1 | 9/2003 | Ismail et al. | |
| 6,637,029 B1 | 10/2003 | Maissel et al. | |
| 6,642,939 B1 | 11/2003 | Vallone et al. | |
| 6,678,890 B1 * | 1/2004 | Cai | 725/24 |
| 6,681,393 B1 | 1/2004 | Bauminger et al. | |
| 6,718,551 B1 * | 4/2004 | Swix et al. | 725/32 |
| 6,782,370 B1 | 8/2004 | Stack | |
| 6,792,412 B1 | 9/2004 | Sullivan et al. | |
| 6,883,176 B1 | 4/2005 | Grooters | |
| 6,898,762 B2 | 5/2005 | Ellis et al. | |
| 6,931,657 B1 | 8/2005 | Marsh | |
| 6,934,964 B1 * | 8/2005 | Schaffer et al. | 725/46 |
| 6,973,034 B1 * | 12/2005 | Natarajan et al. | 370/232 |
| 6,990,676 B1 | 1/2006 | Proehl et al. | |
| 7,020,893 B2 * | 3/2006 | Connelly | 725/97 |
| 7,024,681 B1 * | 4/2006 | Fransman et al. | 725/115 |
| 7,028,071 B1 * | 4/2006 | Slik | 709/201 |
| 7,072,932 B1 * | 7/2006 | Stahl | 709/203 |
| 7,167,895 B1 * | 1/2007 | Connelly | 709/203 |
| 2001/0013127 A1 | 8/2001 | Tomita et al. | |
| 2001/0037507 A1 | 11/2001 | Mori | |
| 2002/0152474 A1 | 10/2002 | Dudkiewicz | |
| 2003/0093792 A1 | 5/2003 | Labeeb et al. | |
| 2003/0103532 A1 | 6/2003 | Bertram et al. | |
| 2004/0117831 A1 | 6/2004 | Ellis et al. | |
| 2005/0193414 A1 | 9/2005 | Horvitz et al. | |
| 2005/0204387 A1 | 9/2005 | Knudson et al. | |
| 2005/0273832 A1 * | 12/2005 | Zigmond et al. | 725/112 |

OTHER PUBLICATIONS

International Search Report, Oct. 29, 2002.

Hu, Qinglong et al., "Power Conservative Multi-Attribute Queries on Data Broadcast," Data Engineering, 16th International Conference, San Diego, CA, pp. 157-166, 2000.

Gummalla, A.C.V. et al., "An Access Protocol for a Wireless Home Network," IEEE Wireless Communications and Networking Conference, pp. 1392-1396, Sept. 21, 1999.

* cited by examiner

501

| NAME | ACTOR | GENRE |
|---|---|---|
| ACTION DUDE | JOE SMITH | ACTION |
| THE FUNNY SHOW | JANE DOE | COMEDY |
| BLAST 'EM | JANE DOE | ACTION |
| HARDY HAR HAR | JOE SMITH | COMEDY |

| ATTRIBUTE | ATTRIBUTE VALUE | RELEVANCE | BELIEVABILITY |
|---|---|---|---|
| ACTOR | JOE SMITH | 0 | 0 |
| ACTOR | JANE DOE | 0 | 0 |
| GENRE | ACTION | 0 | 0 |
| GENRE | COMEDY | 0 | 0 |

| NAME | RATING | RATING TYPE | IN CACHE | NEXT TREATMENT |
|---|---|---|---|---|
| ACTION DUDE | 0 | N/A | YES | N/A |
| THE FUNNY SHOW | 0 | N/A | YES | N/A |
| BLAST 'EM | 0 | N/A | YES | N/A |
| HARDY HAR HAR | 0 | N/A | NO | N/A |

FIG. 7

| NAME | CLASSIFICATION |
|---|---|
| ACTION DUDE | RECEIVE |
| THE FUNNY SHOW | REFUSE |
| BLAST 'EM | N/A |
| HARDY HAR HAR | N/A |

| ATTRIBUTE | ATTRIBUTE VALUE | RELEVANCE | BELIEVABILITY |
|---|---|---|---|
| ACTOR | JOE SMITH | 1 | 0 |
| ACTOR | JANE DOE | -1 | 0 |
| GENRE | ACTION | 1 | 0 |
| GENRE | COMEDY | -1 | 0 |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | 0 |
| GENRE | ACTION | 1 | 1 |
| GENRE | COMEDY | -1 | 0 |

| NAME | RATING | RATING TYPE | IN CACHE | NEXT TREATMENT |
|---|---|---|---|---|
| ACTION DUDE | 1 | EXPLICIT | YES | REPLACE |
| THE FUNNY SHOW | 0 | EXPLICIT | YES | REPLACE |
| BLAST 'EM | 0.5 | IMPLICIT | YES | KEEP |
| HARDY HAR HAR | 0.5 | IMPLICIT | NO | CAPTURE |

| ATTRIBUTE | ATTRIBUTE VALUE | RELEVANCE | BELIEVABILITY |
|---|---|---|---|
| ACTOR | JOE SMITH | 1 | 1 |
| ACTOR | JANE DOE | -1 | -1 |
| GENRE | ACTION | 2 | 2 |
| GENRE | COMEDY | -1 | 0 |

FIG. 12

METHOD AND APPARATUS TO DETERMINE BROADCAST CONTENT AND SCHEDULING IN A BROADCAST SYSTEM

CROSS-REFERENCE TO RELATED APPLICATIONS

The present application contains subject matter related to similar subject matter disclosed in co-pending application Ser. Nos. 09/533,024 and 09/533,048, both filed Mar. 22, 2000.

BACKGROUND OF THE INVENTION

1. Field of the Invention

The present invention relates generally to broadcast systems and, more specifically, the present invention relates to providing content on demand in broadcast systems.

2. Background Information

Broadcast systems traditionally transmit data in one direction from a server system to a plurality of client systems. Users of the client systems typically consume the signals received from the server system as they are broadcast. One paradigm in which users are provided with content on demand involves server systems that broadcast the same data continuously and/or at staggered intervals. Thus, if a user desires to consume a particular data file on demand, the user "tunes in" to one of the repeated broadcasts of the data file. One example of this paradigm can be illustrated with present day "pay per view" movies that are available from cable or satellite television providers. For instance, cable television providers commonly broadcast the same movies repeatedly on multiple channels at staggered intervals. Users that wish to watch a particular movie "on demand" simply tune in to one of the channels on which the desired movie is broadcast at the beginning of one of the times that the movie is broadcast. The continuous and repeated broadcasts of the same data or programs results in a very inefficient use of broadcast bandwidth. Bandwidth used to broadcast the same data repeatedly on multiple channels could otherwise be used to broadcast different data.

Another paradigm for providing content on demand in a broadcast system involves a user recording a particular data file and later accessing the data file "on demand." Continuing with the television broadcast illustration discussed above, an example of this paradigm is a user setting up his or her video cassette recorder (VCR) to record a desired television program. Later, when the user wishes to watch the television program "on demand," the user simply plays the earlier recorded program from his or her VCR. Recently, more advanced digital video recorders have become available, which record the television broadcasts on internal hard drives instead of the video cassette tapes used by traditional VCRs. However, use of the digital video recorders is similar to traditional VCRs in that the users are required to explicitly set the criteria used (e.g. date, time) to determine which broadcasts are recorded on the internal hard drives.

Another limitation with present day broadcast systems is that it is difficult for most users of the client systems to provide feedback to broadcasters with regard to programming. For example, continuing with the television broadcast illustration discussed above, many of today's television broadcasters rely upon Neilson ratings to determine broadcast programming and/or scheduling. Neilson ratings are generally based upon only a small sampling of a cross-section of the public. Consequently, most television viewers have relatively little or no impact on broadcast schedules and/or content.

BRIEF DESCRIPTION OF THE DRAWINGS

The present invention is illustrated by way of example and not limitation in the accompanying figures.

FIG. 5 is an illustration of one example of meta-data broadcast by a server in accordance with the teachings of the present invention.

FIG. 6 is an illustration of one example of a meta-data table updated and maintained by a client in accordance with the teachings of the present invention.

FIG. 7 is an illustration of one example of a content rating table updated and maintained by a client in accordance with the teachings of the present invention.

FIG. 8 is a diagram illustrating one embodiment of data files that are classified by a user in accordance with the teachings of the present invention.

FIG. 9 is a diagram illustrating one embodiment of a meta-data table that is updated in response to user classifications in accordance with the teachings of the present invention.

FIG. 10 is a diagram illustrating one embodiment of a meta-data table that is updated after a user access in accordance with the teachings of the present invention.

FIG. 11 is a diagram illustrating one embodiment of a content rating table that is updated after a user access in accordance with the teachings of the present invention.

FIG. 12 is a diagram illustrating another embodiment of a meta-data table that is updated after another user access in accordance with the teachings of the present invention.

DETAILED DESCRIPTION

In one aspect of the present invention, signaling methods and apparatuses for providing content on demand in a broadcast system are disclosed. In another aspect of the present invention, methods and apparatuses are disclosed for rating content to be broadcast or to be broadcast potentially from a server are disclosed. In yet another aspect of the present invention, methods and apparatuses for dynamically determining the broadcast content and/or schedule of a server are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1A:
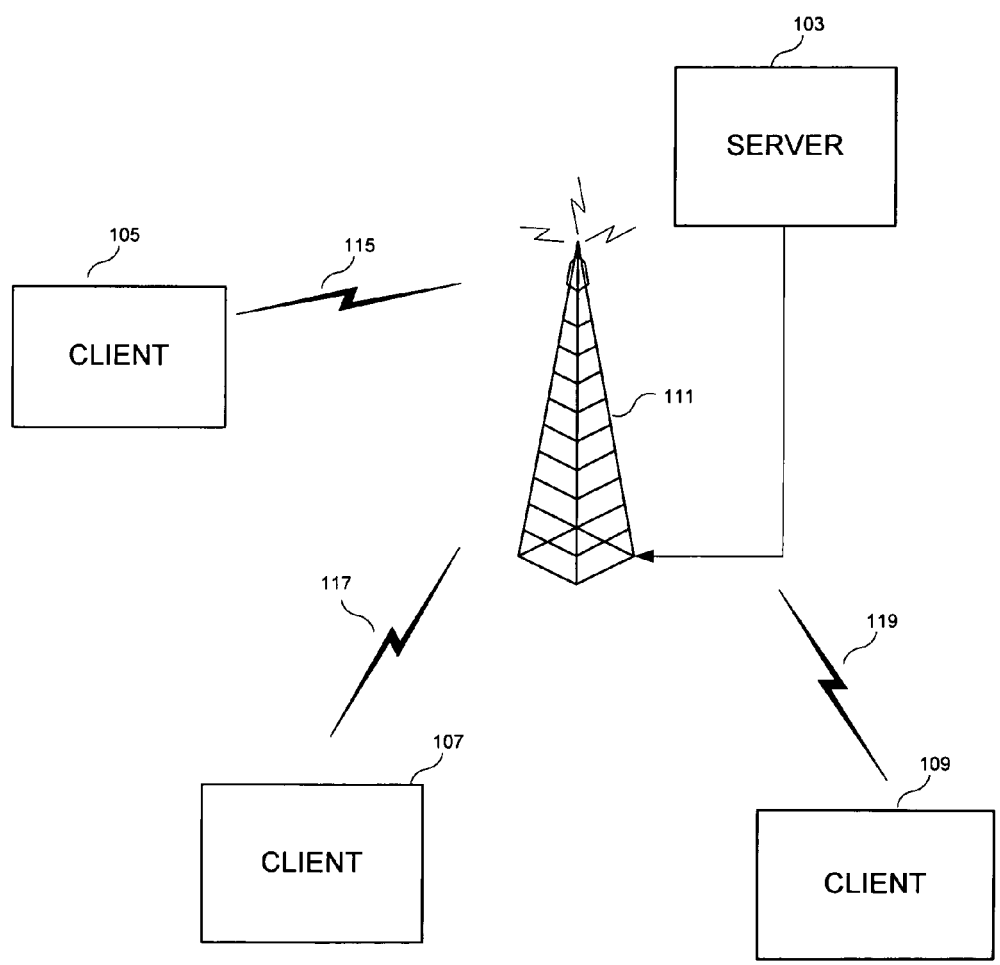
FIG. 1A is a block diagram illustrating one embodiment of a broadcast system in accordance with the teachings of the present invention.

FIG. 1A is an illustration of one embodiment of a broadcast system in accordance with the teachings of the present invention. As illustrated in the depicted embodiment, a server 103 is configured to broadcast information to a plurality of clients 105, 107 and 109. In the embodiment shown in FIG. 1A, client 105 receives a broadcast from server 103 through a link 115 from a broadcast antenna 111. Similarly, client 107 receives a broadcast from server 103 through a link 117 and client 109 receives a broadcast from server 103 through a link 119 from broadcast antenna 111. In one embodiment, links 115, 117 and 119 are uni-directional wireless radio frequency (RF) links from broadcast antenna in a format such as for example, but not limited to known amplitude modulation (AM) or frequency modulation (FM) radio signals, television (TV) signals, digital video broadcast (DVB) signals or the like, which are broadcast through the atmosphere.

In one embodiment, server 103 is configured to broadcast a plurality of data files, which may be received by clients 105, 107 and 109. In one embodiment, the data files may be any combination of a number of different types of files including for example video, audio, graphics, text, multimedia or the like. For purposes of explanation, many of the examples provided in this disclosure to help describe the present invention assume that the data files to be broadcast by the server are audio/video files, such as for example movies with moving images and sound. However, it will be appreciated that the data files broadcast in accordance with the teachings of the present invention are not limited only to audio/video files.

Figure 1B:
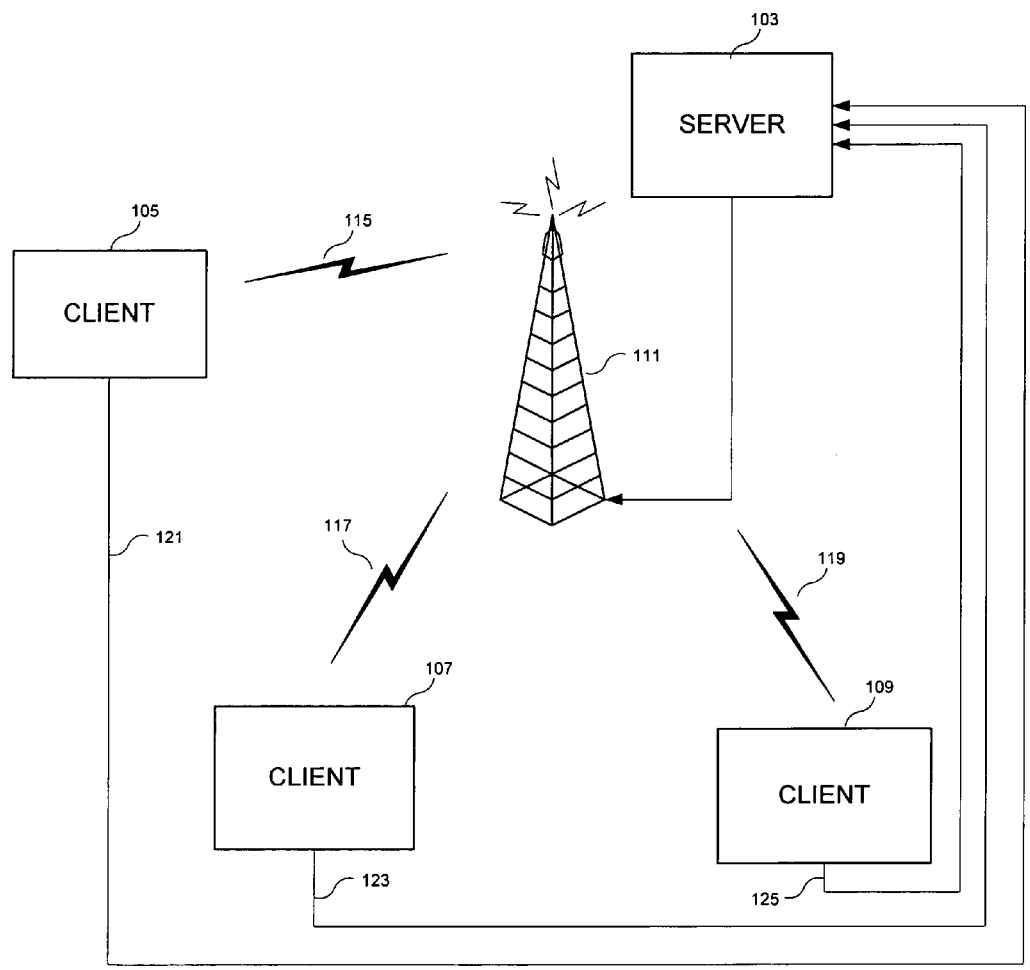
FIG. 1B is a block diagram illustrating another embodiment of a broadcast system in accordance with the teachings of the present invention.

As illustrated in the embodiment shown FIG. 1A, there is a one-way or uni-directional link between the server 103 and clients 105, 107 and 109. However, in another embodiment, it is appreciated that there may also be a communications link between server 103 and each client 105, 107 and 109, respectively. In particular, FIG. 1B is an illustration of the broadcast system of FIG. 1A with the addition of a "back channel" or communications link between each client 105, 107 and 109 and server 103. In particular, the embodiment illustrated in FIG. 1B shows links 121, 123 and 125, which may be used by clients 105, 107 and 109, respectively, to send information back to server 103. In one embodiment, however, links 121, 123 and 125 are not utilized in accordance with the teachings of the present invention. As will be discussed, in another embodiment, links 121, 123 and 125 are utilized in accordance with the teachings of the present invention. Although links 121, 123 and 125 are illustrated in FIG. 1B as direct links between clients 105, 107 and 109 and server 103, it is appreciated that clients 105, 107 and 109 may communicate information to server 103 through indirect links such as for example but not limited to broadcasted wireless signals, network communications or the like.

Figure 1C:
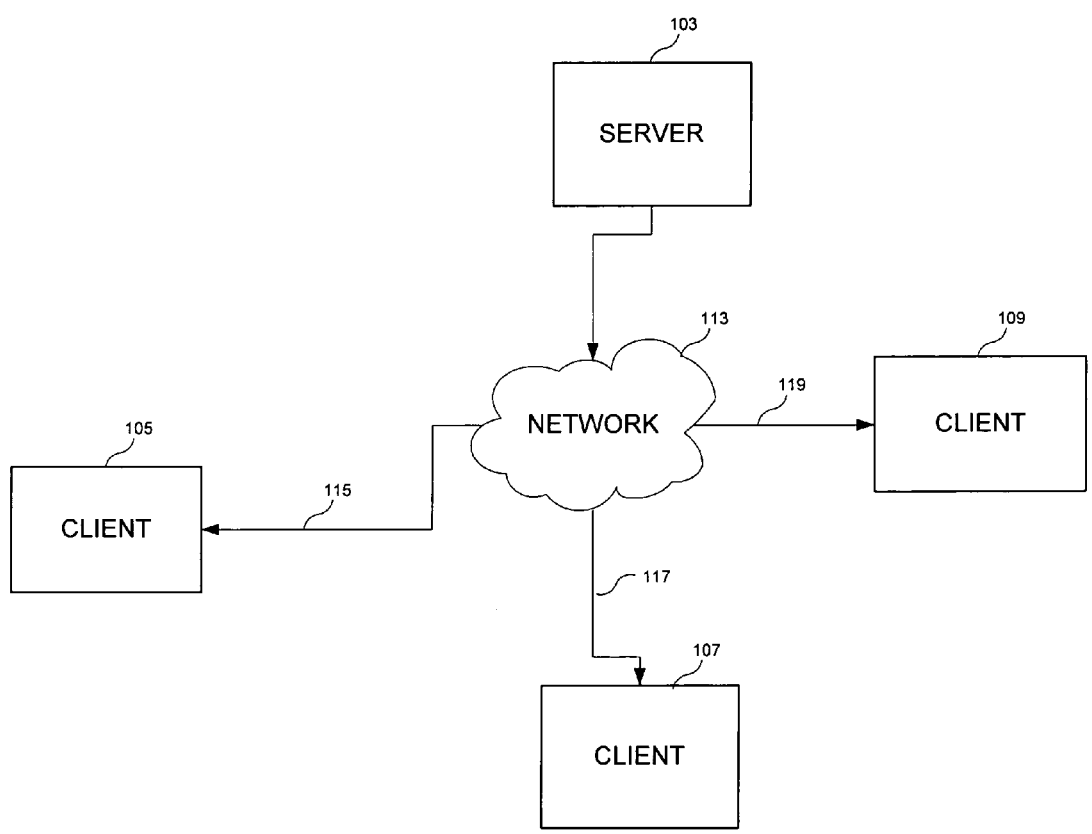
FIG. 1C is a block diagram illustrating yet another embodiment of a broadcast system in accordance with the teachings of the present invention.

FIG. 1C is an illustration of yet another embodiment of a broadcast system in accordance with the teachings of the present invention. As shown, server 103 is coupled to broadcast information to a plurality of clients 105, 107 and 109 through a network 113. In one embodiment, network 113 may be any type of communications network through which a plurality of different devices may communicate such as for example but not limited to the Internet, a wide area network (WAN), a local area network (LAN), an intranet, or the like.

In the embodiment illustrated in FIG. 1C, client 105 is coupled to receive information broadcast from server 103 through link 115. Similarly, client 107 is coupled to receive information broadcast from server 103 through link 117 and client 109 coupled to receive information broadcast from server 103 through link 119. It is noted that in the embodiment illustrated in FIG. 1C, links 115, 117 and 119 are shown as uni-directional links from network 113 to clients 105, 107 and 109. In another embodiment, links 115, 117 and 119 are bi-directional links, which enable clients 105, 107 and 109 to communication information to server 103.

Figure 2:
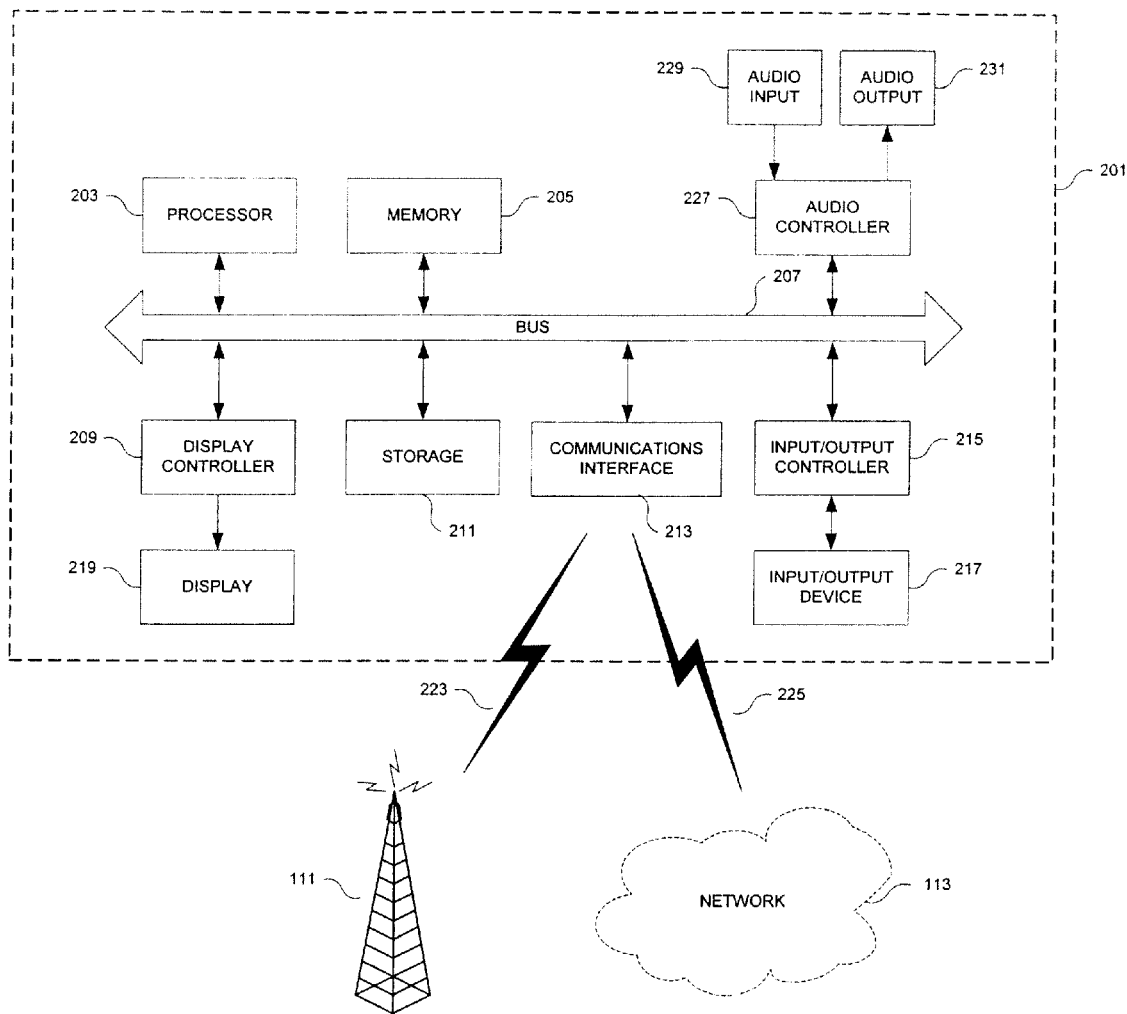
FIG. 2 is a block diagram of one embodiment of a computer system representative of a client or a server in accordance with the teachings of the present invention.

FIG. 2 is a block diagram illustrating one embodiment of a machine 201 that may be used for the server 103, or clients 103, 105 or 107 in accordance with the teachings of the present invention. In one embodiment, machine 201 is a computer or a set top box that includes a processor 203 coupled to a bus 207. In one embodiment, memory 205, storage 211, display controller 209, communications interface 213, input/output controller 215 and audio controller 227 are also coupled to bus 207.

In one embodiment, machine 201 interfaces to external systems through communications interface 213. Communications interface 213 may include a radio transceiver compatible with AM, FM, TV, digital TV, DVB, wireless telephone signals or the like. Communications interface 213 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

In one embodiment, a carrier wave signal 223 is received by communications interface 213 to communicate with antenna 111. In one embodiment, carrier wave signal 225 is received/transmitted between communications interface 213 and network 113. In one embodiment, a communications signal 225 may be used to interface machine 201 with another computer system, a network hub, router or the like. In one embodiment, carrier wave signals 223 and 225 are considered to be machine readable media, which may be transmitted through wires, cables, optical fibers or through the atmosphere, or the like.

In one embodiment, processor 203 may be a conventional microprocessor, such as for example but not limited to an Intel x86 or Pentium family microprocessor, a Motorola family microprocessor, or the like. Memory 205 may be a machine readable medium such as dynamic random access memory (DRAM) and may include static random access memory (SRAM). Display controller 209 controls in a conventional manner a display 219, which in one embodiment may be a cathode ray tube (CRT), a liquid crystal display (LCD), an active matrix display, a television monitor or the like. The input/output device 217 coupled to input/output controller 215 may be a keyboard, disk drive, printer, scanner and other input and output devices, including a television remote, mouse, trackball, trackpad, joystick, or the like. In one embodiment, audio controller 227 controls in a conventional manner audio output 231, which may include for example audio speakers, headphones, an audio receiver, amplifier or the like. In one embodiment, controller also controls in a conventional manner audio input 229, which may include for example a microphone or input(s) from an audio or musical device, or the like.

Storage 211 in one embodiment may include machine readable media such as for example but not limited to a magnetic hard disk, a floppy disk, an optical disk, a smart card or another form of storage for data. In one embodiment, storage 211 may include removable media, read-only media, readable/writable media or the like. Some of the data may be written by a direct memory access process into memory 205 during execution of software in computer system 201. It is appreciated that software may reside in storage 211, memory 205 or may be transmitted or received via modem or communications interface 213. For the purposes of the specification, the term "machine readable medium" shall be taken to include any medium that is capable of storing data, information or encoding a sequence of instructions for execution by processor 203 to cause processor 203 to perform the methodologies of the present invention. The term "machine readable medium" shall be taken to include, but is not limited to solid-state memories, optical and magnetic disks, carrier wave signals, and the like.

In one embodiment, a broadcast system, such as for example one similar to any of those illustrated in FIGS. 1A-1C, is configured to have a server 103 broadcast a plurality of data files to a plurality of clients 105, 107 and 109. As will be discussed in greater detail below, each of the plurality of data files is described with meta-data in accordance with teachings of one embodiment of the present invention. In general, meta-data can be considered as a set of descriptors or attribute values that describe content or data files to be broadcast or potentially broadcast from server 103. The meta-data of the present invention provides information that enables client systems 105, 107 and 109 to reason and make informed decisions regarding the content of data files to be broadcast later by server 103. As will be discussed, various embodiments of the present invention utilize the meta-data for client-side filtering, storage management and other personalization techniques as well as determine broadcast schedules and content of future server broadcasts.

Figure 3:
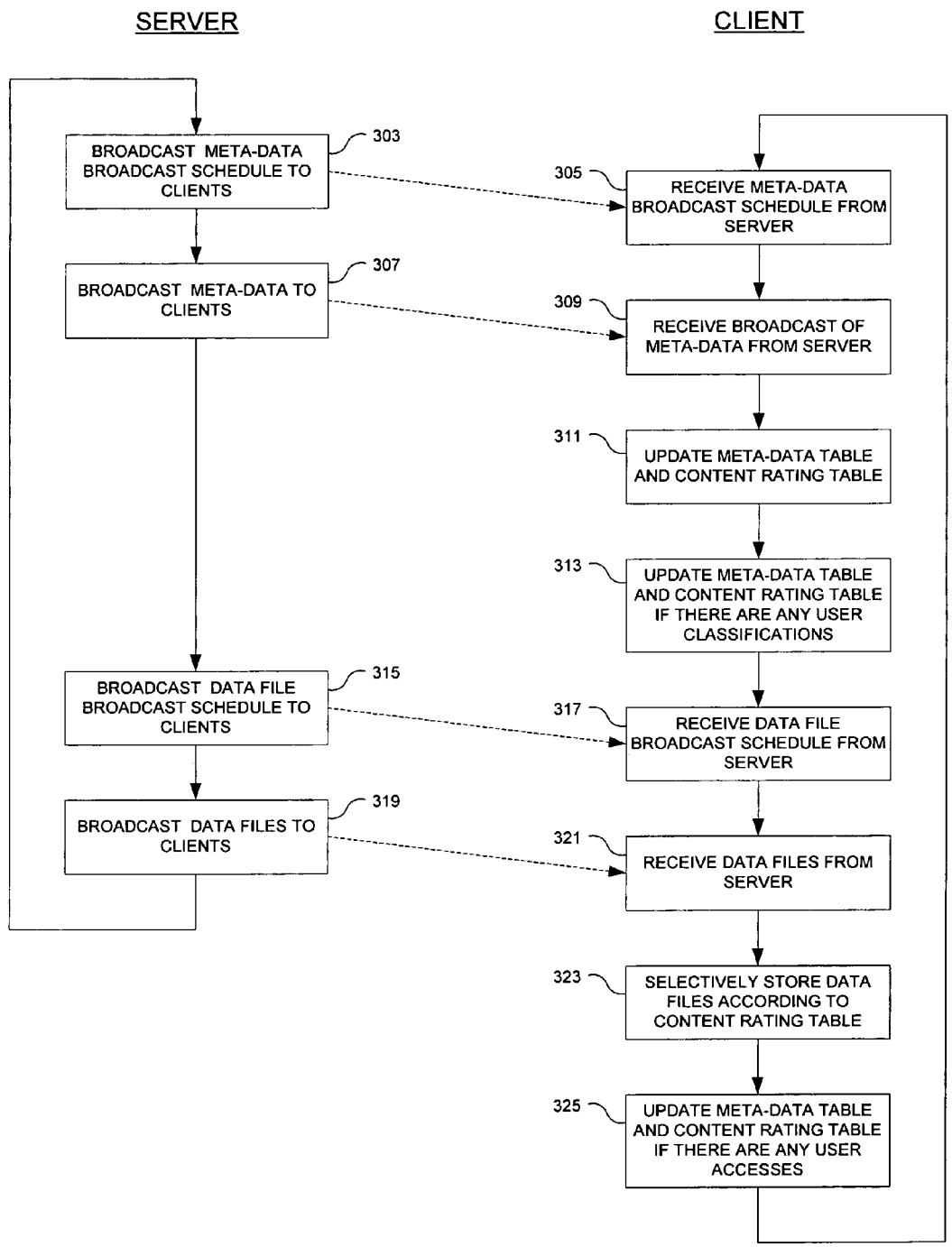
FIG. 3 is a flow diagram illustrating one embodiment of the flow of events in a server and a client when broadcasting meta-data and data files in accordance with the teachings of the present invention.

FIG. 3 is a flow diagram illustrating the processing that is performed in accordance with the teachings of one embodiment of the present invention. FIG. 3 illustrates one embodiment of a signaling protocol in which signals are transmitted such that client systems can locate and acquire broadcast content. This includes a pre-broadcast of meta-data by server 103 to client systems 105, 107 and 109. In particular, process block 303 of FIG. 3 shows that the server broadcasts the meta-data broadcast schedules to the clients. In one embodiment, the meta-data broadcast schedule indicates some point in the future when the actual meta-data of the present invention is going to be broadcast by the server. In one embodiment, the client systems use known ports such as for example those used in the program and system information protocol (PSIP), DVB, service advertising protocol (SAP) or the like to listen for upcoming service announcements from the server.

In one embodiment, each client 105, 107 and 109 contains a known scheduling service, which accepts requests to wake up, or be activated, at a specific time to receive the information broadcast by the server. This scheduling service enables the client to wake up at a specified time and select a specified service. For example, in one embodiment, this selection process can be accomplished by tuning to a specific frequency, such as for example in an Advanced Television Systems Committee (ATSC) or a DVB transponder or the like. In one embodiment, the selection process or can be based on a set of data, such as for example multi-cast Internet protocol (IP) addresses, which define a service.

In one embodiment, a client application registers with the client signaling system to receive signals from a specific content provider. The client signaling system maintains a table of applications associated with specific content providers. In one embodiment, information from the server is broadcast over known addresses such that each client can use the known address.

Process block 305 shows that the client receives the meta-data broadcast schedule from the server. In one embodiment, client systems 105, 107 and 109 capture and process this pre-broadcast information in order to determine when to wake-up and receive content, where to receive the content and which content to receive. In one embodiment, when the meta-data broadcast schedule is received by the client, the registered application in the client is notified to receive the meta-data broadcast schedule.

In one embodiment, the clients wake-up at the pre-specified time indicated in the meta-data broadcast schedule to receive the meta-data from the server. Process block 307 shows that the meta-data is then actually broadcast from the server to the clients at the time specified in the meta-data broadcast schedule. Process block 309 shows that the client receives the broadcast of meta-data from the server. As will be discussed, the meta-data includes descriptions of a plurality of data files that will be broadcast or potentially broadcast later by the server system.

Process block 311 shows that the client system then updates a meta-data table and a content rating table. In one embodiment, a meta-data table and a content rating table are updated and maintained internally or locally by each client system in accordance with the teachings of the present invention.

In one embodiment, a user of the client system may optionally classify any one or more of the plurality of data files that are described by the received meta-data. As will be discussed, the meta-data table and content rating table are updated by the client if there are user classification. This is shown in FIG. 3 with process block 313.

In one embodiment, the clients wake-up to receive a data file broadcast schedule from the server. In one embodiment, the data file broadcast schedule indicates a future time in which specific data files, which were described in the previously broadcast meta-data, will be broadcast by the server. Process block 315 shows that the data files are then actually broadcast from the server to the clients at the time specified in the data file broadcast schedule. Process block 317 shows that the client receives the broadcast of data file broadcast schedule from the server.

In one embodiment, the clients wake-up at the pre-specified time indicated in the data file broadcast schedule to receive the data files from the server. Process block 319 shows that the data files are then actually broadcast from the server to the clients at the time specified in the data file broadcast schedule.

In one embodiment, process block 321 shows that the client receives the broadcast of the data files from the server. In one embodiment, process block 323 shows that client-side filtering according to the present invention is provided to the client selectively storing data files according to the content rating table. In another embodiment, client-side filtering is provided by the client selectively waking up to selectively receive data files broadcast from the server according to the content rating table. In this embodiment, the client then stores the data files that were selectively received by the client according to the content rating table.

In one embodiment, process block 325 shows that the client then updates the meta-data table and content rating table if there are any user accesses of the stored data files. For purposes of this disclosure, a user access may include a user interacting with, viewing, watching, listening to, reading, consuming, etc., a data file. For instance, one example of a user accessing a data file may be the user watching a particular movie or listening to a particular song provided by one of the stored data files in client. In one embodiment, a user access will result in the meta-data table and content rating table on the client being updated locally.

Figure 4:
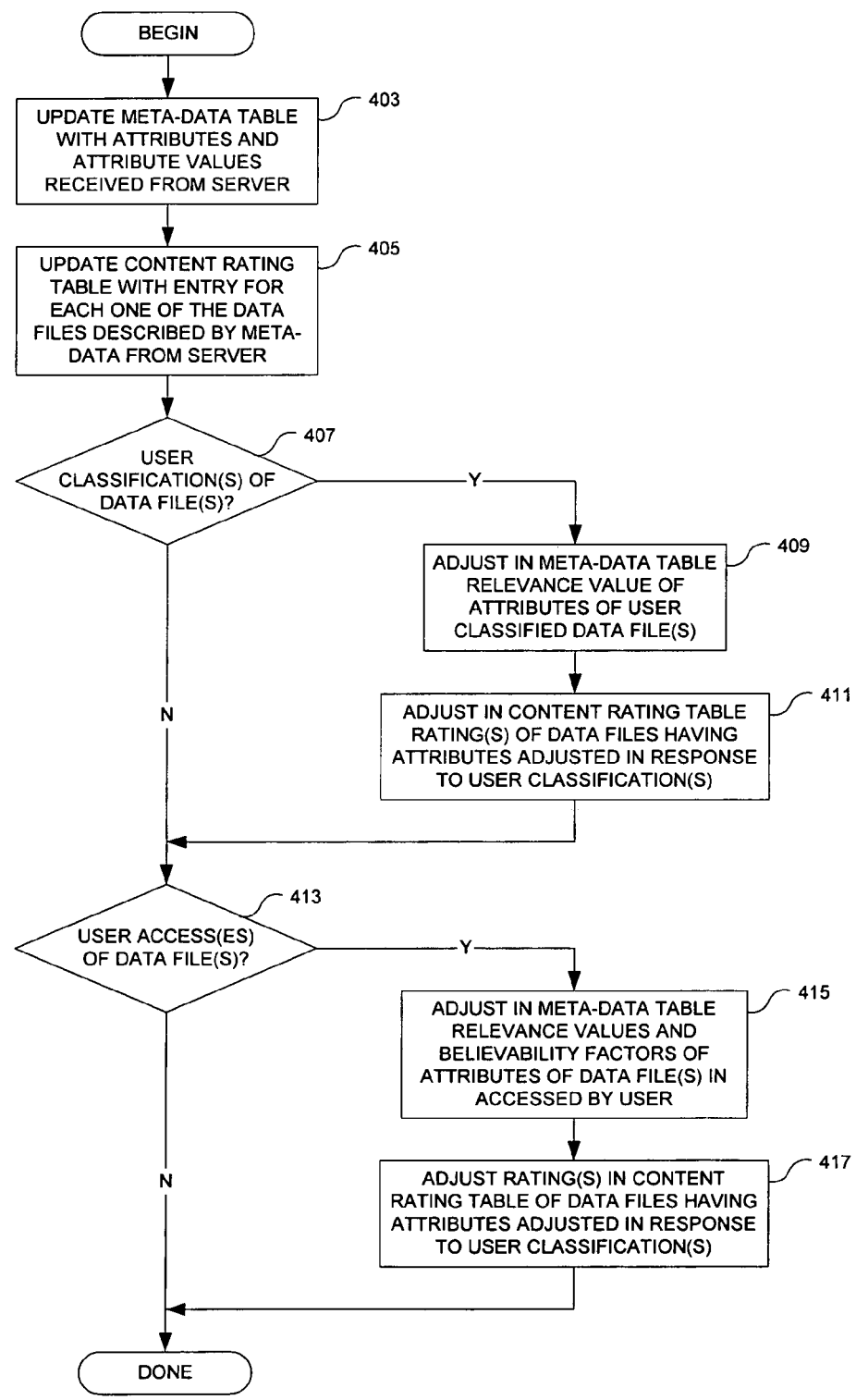
FIG. 4 is a flow diagram illustrating one embodiment of the flow of events in a client when processing meta-data broadcast from a server to maintain a meta-data table and content rating table in accordance with the teachings of the present invention.

FIG. 4 is a more detailed flow diagram illustrating one embodiment of the flow of events in a client when processing meta-data broadcasted from a server and updating and maintaining a meta-data table and a content rating table in accordance with the teachings of the present invention. In particular, process block 403 shows that a meta-data table is updated with attributes and attribute values included in the meta-data broadcasted from the server. Process block 405 shows that the content rating table is then updated with an entry for each one of the data files described by the meta-data broadcast from the server.

In one embodiment, it is assumed that a meta-data table, a content rating table and a plurality of data files already exist in the client system. In one embodiment, the meta-data table, content rating table and plurality of data files may be stored and maintained in the client system in memory 205, storage 211 or by accessing a local network or the like with machine 201, as illustrated in the embodiment shown in FIG. 2.

To help illustrate the meta-data aspect of the present invention, FIG. 5 is an example of one embodiment of meta-data 501, which may be broadcast by the server 103 to the clients 105, 107 and 109. For explanation purposes, it is assumed that the data files broadcast by server 103 in this example are audio/video files such as for example movies or TV programming. As mentioned above, data files may be other types of files such as for example but not limited to audio, graphics, text, multi-media or the like.

In the illustrated embodiment, meta-data 501 in FIG. 5 shows that four movies, or data files, will be broadcast later by server 103. These movies shown in this example are "Action Dude," "The Funny Show," "Blast 'Em" and "Hardy Har Har." Meta-data 501 includes attributes and attribute values that describe each one of the movies to be broadcast later by server 103. In the example illustrated, two attributes are provided to describe each movie in meta-data 501. The attributes shown in FIG. 5 are "Actor" and "Genre." It is appreciated that other embodiments of the present invention may include different attributes as well as other attributes values. For instance, a non-exhaustive list of other attributes that may be used to describe movies may include "Director," "Year," "Effects,""Ending," etc. In one embodiment, for example, 40-50 different attributes are provided to describe movies in accordance with the teachings of the present invention.

Referring back to the particular example shown in FIG. 5, "Action Dude" is an "action" movie featuring actor "Joe Smith." "The Funny Show" is "comedy" movie featuring actress "Jane Doe." "Blast 'Em" is an "action" movie featuring actor "Jane Doe." "Hardy Har Har" is a "comedy" movie featuring "Joe Smith."

To help illustrate the meta-data table aspect of the present invention, FIG. 6 is an example of one embodiment of meta-data table 601, which is updated and maintained locally by each client 105, 107 and 109. In the illustrated embodiment, meta-data table 601 in FIG. 6 has been populated with the data included in meta-data 501, which was broadcasted earlier from server 103. In one embodiment, meta-data table 601 includes a list of attributes, attribute values and corresponding relevance values and believability factors. In particular, meta-data table 601 includes attribute values "Joe Smith," "Jane Doe," "action," and "comedy." At this time, the relevance values and believability factors for attribute values "Joe Smith," "Jane Doe," "action," and "comedy" are all zero in FIG. 6. As will be shown, in one embodiment, the relevance values and believability factors of the present invention will be updated and maintained as the user interacts with the client system.

In one embodiment, the relevance values in meta-data table 601 are indicators as to how relevant the associated attribute and attribute values are for predicting a particular user's behavior. For instance, the relevance value indicates how likely it is for the user to watch a particular movie because of this particular attribute value. In one embodiment, relevance values in meta-data table 601 are within a range of values such as for example from –10 to 10. As will be discussed, the relevance value may be increased if for example the user watches a particular movie or at least expresses an interest in a particular movie having that particular attribute value. Conversely, the relevance value may be decreased if the user for example does not watch a particular movie or if the user explicitly indicates that he or she does not want to watch a particular movie having that particular attribute value.

In one embodiment, the believability factors in meta-data table 601 are weighting factors to be applied to specific attribute and attribute value pairs when rating or predicting whether a user will actually access a particular data file having that particular attribute value. In one embodiment, believability factors in meta-data table 601 are within a range of values such as for example from –10 to 10. In one embodiment, the believability factors may be increased for example when an attribute value accurately predicts a data file in which the user is interested. Conversely, the believability factors may be decreased when a user is interested in the data file, even though the particular attribute value indicates otherwise.

In one embodiment, meta-data table 601 entries are constructed from the aggregation of all meta-data 501 associated with potential content or data files to be broadcast from server 103. In one embodiment, entries in meta-data table 601 are updated based on explicit user requests. In addition, updates to meta-data table 601 may also be implicitly based on whether a user accesses specific data files having particular attribute values, independent of whether the user explicitly classifies a particular movie.

To help illustrate the content rating table aspect of the present invention, FIG. 7 is an example of one embodiment of a content rating table 701, which in one embodiment is updated and maintained locally by each client 105, 107 and 109. In the illustrated embodiment, content rating table 701 in FIG. 7 includes a list of the data files described in meta-data 501 as well as any additional data files that are currently stored or cached locally by the client.

In one embodiment, data files may be stored locally by the client in for example memory 205, storage 211 or in a locally accessible network by machine 201 of FIG. 2. For purposes of this disclosure, data files being stored locally by the client may also be interpreted to include a data file stored "locally" by the client in a known network storage configuration, separate from the server. For purposes of this disclosure, the data file being stored or cached locally by the client is to be interpreted as the data file being stored for later access, retrieval or consumption. In one embodiment, the local cache of the present invention is considered to be a first level cache. Thus, the local cache of the present invention is sized accordingly to increase the possibility of a single hit.

Referring back to the continuing example of data files representing audio/video files, a movie is stored locally by the client. After a user watches the movie, the storage space occupied by the movie is generally considered to be available for storage of another movie to be broadcast sometime later. Thus, it is appreciated that the local cache of the client system is modeled as the single use system, e.g. fire and forget, in accordance with teachings of the present invention. In one embodiment, it is assumed that when a user accesses a data file, it is not likely that the user will want to access that same data file again. If a user has not watched a particular movie, the storage space occupied by that movie is generally considered not to be available for storage of another movie. However, if there is no additional storage space available and a higher rated movie is to be broadcast, the lower rated unwatched movie is replaced by the higher rated movie in accordance with the teachings of the present invention.

Referring back to the embodiment of content rating table 701 shown in FIG. 7, each movie also has an associated rating, a rating type indicator, an in cache indicator and a next treatment indicator. In one embodiment, the rating indicates a rating value for the associated data file. The rating value in one embodiment may either be explicitly input by a user or implicitly generated by the client system by processing meta-data associated with that particular data file. In one embodiment, a relatively high rating value predicts that the particular data file may be of interest to the user. Conversely, in one embodiment, a relatively low rating value predicts that the particular data file is unlikely to be of interest to the user.

In one embodiment, the rating type indicator indicates whether the rating value of this particular data file was a result of explicit input from the user or if the rating value was implicitly generated by the client system. Thus, in one embodiment, the rating type indicator of content rating table 701 may be explicit, implicit or N/A if the data file or movie has not yet been rated. In one embodiment, if a data file has been explicitly classified by a user, the rating values of attribute values of the data file are no longer updated implicitly by the client system. However, if a data file has not yet been classified or has only been implicitly rated by the client system, the rating of the attribute values of the data file may be further updated or adjusted by the client system.

In one embodiment, the in cache indicator indicates whether that particular data file is currently stored or cached locally by the client. In the embodiment illustrated in FIG. 7, the movies "Action Dude," "The Funny Show" and "Blast 'Em" already exist in the local storage of the client system. Conversely, the movie "Hardy Har Har" has not been stored in the local storage of the client system in the example illustrated in FIG. 7.

In one embodiment, the next treatment indicator is used to track future actions to be taken for the particular data file. For example, if a movie has already been watched by the user, the next treatment indicator would indicate "replace" to indicate that the storage space occupied by that particular movie is available for storage of another movie. In one embodiment, if the movie has not yet been watched by the user, the next treatment indicator would indicate "keep." In one embodiment, if the movie has not been stored locally by the client and if the rating value predicts that this particular movie may be of interest to the user, the next treatment indicator would indicate "capture." In one embodiment, if the movie has not yet been broadcast by the server and the rating predicts that this movie is unlikely to be of interest to the user, the next treatment indicator would indicate "ignore."

As was discussed back to FIG. 4, process blocks 403 and 405 show that the meta-data table and the content rating table are updated according to meta-data broadcast from the server. Decision block 407 shows that it is then determined whether there is a user classification of any of the data files. Referring briefly to FIG. 8, an example is shown where a user classifies some of the movies, as described by meta-data 501. In particular, the user has expressed interest in the movie "Action Dude" by indicating that he or she wishes to receive that movie. In this example, the user has expressed that he or she does not have any interest in the movie "The Funny Show" by indicating that he or she refuses that movie. In this example, the user has not provided any information or classification regarding any of the remaining movies.

Referring back to FIG. 4, if the user has classified any of the data files, process block 409 shows that the relevance values of the particular attributes of the classified data files are updated in meta-data table 601. Process block 411 shows that the ratings of data files having attribute values with relevance values that were adjusted in response to the user classification(s) are also adjusted. In one embodiment, if the user has not classified any data files, process blocks 409 and 411 are skipped.

To illustrate an example of when a user classifies data files, FIG. 9 shows a meta-data table 601 that is updated or adjusted in response to a user classification. In the example provided in FIG. 8, the user indicated that he or she was interested in the movie "Action Dude." Meta-data 501 in FIG. 5 shows that "Action Dude" features actor "Joe Smith" and is an "action" movie. Thus, referring to meta-data table 601 in FIG. 9, the relevance values for attribute values "Joe Smith" and "action" are adjusted to reflect that the user explicitly expressed an interest in "Action Dude." In one embodiment, the relevance values are increased to reflect that the user was interested. As will be discussed, in one embodiment, the believability factors associated with each attribute value are not updated until there is a user access of the data file having that particular attribute value.

Continuing with the example of FIG. 8, the user indicated that he or she was not interested in the movie "The Funny Show." Meta-data 501 in FIG. 5 shows that "The Funny Show" features actress "Jane Doe" and is a "comedy" movie. Thus, referring back to meta-data table 601 in FIG. 9, the relevance values for attribute values "Jane Doe" and "comedy" are adjusted to reflect that the user explicitly expressed that he or she was not interested in "The Funny Show." In one embodiment, the relevance values are decremented to reflect that the user was not interested.

Continuing with the example of FIG. 8, the user did not provide any information regarding the movies "Blast 'Em" and "Hardy Har Har." Accordingly, the relevance values of the attribute values associated with "Blast 'Em" and "Hardy Har Har" are not updated in meta-data table 601.

As will be discussed, in one embodiment, updates to the ratings in content rating table 701, as described in process block 411, are related to the relevance values and believability factors of the attribute values listed in meta-data table 601. A detailed description of the processing that occurs in process block 411 will be discussed below with a discussion of process block 417.

Referring back to FIG. 4, if the user accesses any of the data files, e.g. the user watches a movie, as determined in decision block 413, process block 415 shows that the relevance values and the believability factors of the particular attributes of the user accessed data files are updated in meta-data table 601. Process block 417 shows that the ratings of data files having attribute values with relevance values that were adjusted in response to the user access(es) are also adjusted. If the user has not accessed any data files, process blocks 415 and 417 are skipped.

To illustrate an example of a user accessing data files, assume that the user watches the movie "Action Dude." Meta-data 501 in FIG. 5 shows that "Action Dude" features actor "Joe Smith" and is an "action" movie. In one embodiment, each time a user accesses or interacts with particular data file, the believability factor of the attribute values of that film are adjusted or updated. In one embodiment, for attribute values having relevance values greater than zero, the believability factor for that attribute value is increased, since that attribute value accurately served as a predictor for a data file that the user would access. In one embodiment, for attribute values having relevance values less than zero, the believability factor for that attribute value is decreased, since that attribute value did not accurately serve as a predictor for a data file that the user would access. Therefore, FIG. 10 shows a meta-data table 601 that is updated or adjusted in response to the user access of "Action Dude." In this example, the believability factors of "Joe Smith" and "action" are increased since the relevance values for these attribute values were greater than zero.

In one embodiment, the relevance values associated with implicitly rated data files are also increased in meta-data table 601 in response to a user access. However, in the example shown in meta-data table 601 of FIG. 10, "Action Dude" was explicitly classified by the user. In one embodiment, the relevance values are not updated in meta-data table 601 in response to a user access of data files explicitly classified by the user.

FIG. 11 shows content rating table 701, which is updated in response to the user access of "Action Dude," as described in process block 417. As mentioned earlier, content rating table 701 is also updated as described in process block 411 in accordance with the teachings of the present invention. As shown in content rating table 701 of FIG. 11, "Action Dude" has a rating value of 1. The rating type of "Action Dude" is "explicit" because the user explicitly classified "Action Dude," as described above in connection with FIG. 8. The in cache indicator indicates that "Action Dude" is presently locally stored by the client system. The next treatment indicator indicates replace because the user has already watched "Action Dude."

In one embodiment, the rating values in content rating table 701 are determined as follows. Meta-data 501 shows that "Action Dude" has the attribute values "Joe Smith" and "action." Meta-data table 601 of FIG. 10 shows that "Joe Smith" has a relevance value of 1 and a believability factor of 1. Meta-data table 601 of FIG. 10 also shows that "action" has a relevance value of 1 and a believability factor of 1. In one embodiment, the rating value of a particular data file is determined considering all of the relevance values combined with their respective believability factors for all the attribute values of the data file. For instance, in one embodiment, the rating value for a data file is equal to the average of all of products of each relevance value and corresponding believability factor for the attribute values of the data file.

To illustrate, referring to "Action Dude" in content rating table 701 of FIG. 11, the product of the relevance value and believability factor of "Joe Smith" is 1*1, which equals 1. The product of the relevance value and believability factor of "action" is 1*1, which equals 1. The average of the products, 1 and 1, is 1. Therefore, the rating of "Action Dude" in content rating table 701 of FIG. 11 is 1.

Similarly, with regard to "Blast 'Em" in content rating table 701, "Blast 'Em" has the attribute values "Jane Doe" and "action." The relevance value and believability factors for "Jane Doe" in meta-data table 601 of FIG. 10 are −1 and 0, respectively. Thus, the rating of "Blast 'Em" in content rating table 701 is the average of 1*0 and 1*1, which equals 0.5. The ratings for "The Funny Show" and "Hardy Har Har" in content rating table 701 in the example shown in FIG. 11 are determined in a similar fashion in one embodiment of the present invention.

It is noted that since the user classified the movies "Action Dude" and "The Funny Show" above in FIG. 8, these movies have an explicit rating type as shown in content rating table 701 of FIG. 11. Since the user did not classify the movies "Blast 'Em" and "Hardy Har Har," these movies have an implicit rating in content rating table 701.

It is appreciated that the discussion above provides one example of how the rating values in content rating table 701 are determined in accordance with the teachings of the present invention. It is noted that ratings values may be determined in other ways in accordance with the teachings of the invention, which consider the relevance values and believability factors for each of the attribute values of a data file.

In one embodiment, the entry for next treatment in content rating table 701 is determined in part by the rating and in cache values for the particular data file. For example, assume in one embodiment that a rating of greater than zero indicates that the user is predicted to have at least some interest in that particular movie. Therefore, the movies "Blast 'Em" and "Hardy Har Har" may be of some interest to the user. Thus, the next treatment indicates that the movie "Blast 'Em" will be kept in storage and the movie "Hardy Har Har" will be captured when it is later broadcast by the server. As mentioned above, the movie "Action Dude" is marked for replacement in the next treatment field because it has already been watched by the user.

In one embodiment, future interactions by a user with the client system results in similar processing as described above. For instance, assume that the user now watches the movie "Blast 'Em." In this particular example, the user did not classify the movie "Blast 'Em" before watching the movie. In one embodiment, both of the relevance values and believability factors are updated for the attribute values of unclassified data files that are accessed, as shown in meta-data table 601 of FIG. 12. Recall from FIG. 5 that the movie "Blast 'Em" features "Jane Doe" and is an "action" movie. As shown in FIG. 10, the relevance value of "Jane Doe" was less than zero, or −1, prior to the user watching "Blast 'Em." Nevertheless, in this example, the user watched "Blast 'Em," despite the fact that it featured actress "Jane Doe." Accordingly, the believability factor of the "Jane Doe" attribute the value is adjusted downward since this particular attribute value now appears less likely or relevant when predicting a user's viewing habits. In one embodiment, since the relevance value is already less than zero, the believability factor is not adjusted further downward. However, the relevance value and believability factor for the attribute value "action" are adjusted upwards since "action" had a relevance value of greater than zero prior to the user watching "Blast 'Em." Thus, in this example, the relevance value is adjusted upwards from 1 to 2 and the believability factor is also adjusted upwards from 1 to 2. Therefore, the content rating table 601 of FIG. 12 now predicts that "action" movies are movies that the user is more likely to watch.

In one embodiment, each time the user interacts with the client system, the meta-data table 601 and the content rating table 701 are updated. Updates to meta-data table 601 and content rating table 71 are performed when the user accesses data files as well as when the user explicitly classifies data files. It is appreciated that the user is not required to classify data files explicitly in order for the meta-data table 601 and content rating table 701 to be updated in accordance with the teachings of the present invention. As a result, the content rating table over time will more accurately predict data files in which the user is interested.

In one embodiment, the data files in which the user is predicted implicitly to be most interested as well as the data files in which the user explicitly classified an interest will be the data files that are cached locally on the client system. In effect, the movies that the user is most likely to want to watch are automatically stored locally, and therefore available "on demand," in accordance with teachings of the present invention without the user having to explicitly request these movies in advance or explicitly specify criteria used to identify the movies.

As can be appreciated, by storing the data files locally on each client, broadcast bandwidth is utilized more efficiently in accordance with teachings of the present invention. Indeed, when a user watches a movie from the local storage of the client, no additional broadcast bandwidth is utilized. In addition, it is also appreciated that a substantial amount of the processing performed in a system according to the teachings of the present invention is performed on each of the client systems when updating their respective meta-data tables and content rating tables. This distributed processing of the present invention enables the presently disclosed broadcast system to scale across a very large number of users since the incremental cost to the server for each additional client is zero.

In another embodiment, ratings values such as for example those generated in the content rating tables maintained and updated by client systems of the present invention may be used to determine broadcast content and schedules of a server in accordance with teachings of the present invention. For instance, assume a broadcast system such as for example the one described above in FIG. 1B. As shown in the depicted embodiment, server 103 broadcasts information to a plurality of clients 105, 107 and 109. In the depicted embodiment, each client 105, 107 and 109 also includes a communications link 121, 123 and 125, respectively, back to server 103. In one embodiment, the communications links 121, 123 and 125 are used by server 103 to receive ratings from each client 105, 107 and 109, respectively. In one embodiment, the ratings received from each client are generated in a manner similar to that discussed above. In one embodiment, server 103 includes processing that aggregates the ratings received from each client and is therefore able to identify the most highly rated data files. In one embodiment, server 103 then broadcasts the most highly rated data files. In one embodiment, the order or time in which server 103 broadcasts the data files is determined at least in part by the aggregated ratings received from each of the clients.

Figure 13:
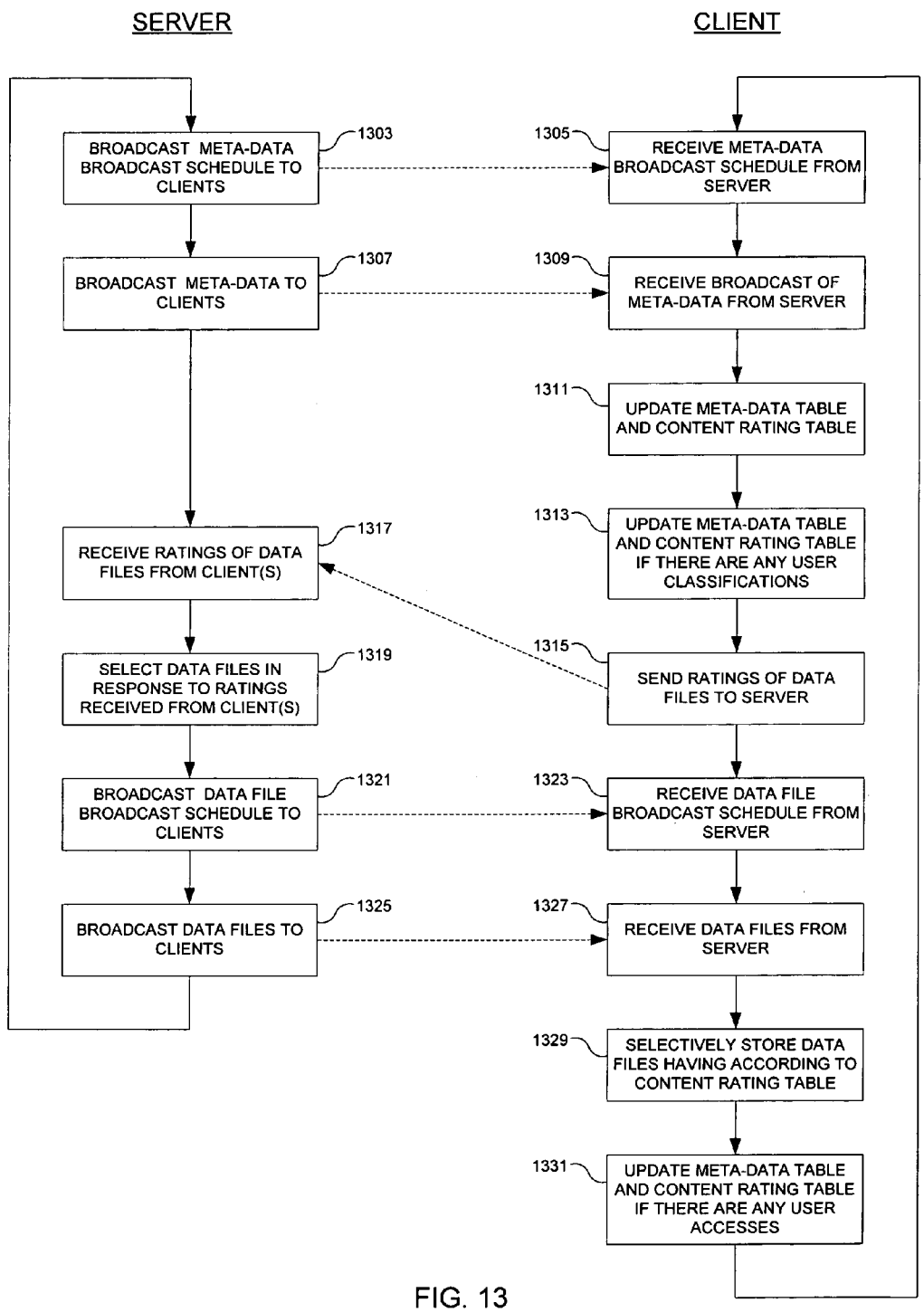
FIG. 13 is a flow diagram illustrating one embodiment of the flow of events in a server and a client when broadcasting meta-data and data files and the server receiving content ratings from the client(s) in accordance with the teachings of the present invention.

For instance, FIG. 13 is a flow diagram illustrating one embodiment of the flow of events in a server and a client of a broadcast system in which broadcast content and schedules are determined in response to client ratings in accordance with the teachings of the present invention. As shown, process block 1303 of FIG. 13 shows that the server broadcasts meta-data broadcast schedules to the clients. In one embodiment, the meta-data broadcast schedule indicates some point in the future when meta-data is going to be broadcast by the server.

Process block 1305 shows that the client receives the meta-data broadcast schedule from the server. In one embodiment, client systems 105, 107 and 109 capture and process this pre-broadcast meta-data information in order to determine when to receive content, where to receive content and which content to receive. In one embodiment, the clients wake-up at the pre-specified time indicated in the meta-data broadcast schedule to receive the meta-data from the server. In one embodiment, the meta-data describe a plurality of data files that will potentially be broadcast later by the server. Process block 1307 shows that the meta-data is then actually broadcast from the server to the clients at the time specified in the meta-data broadcast schedule. Process block 1309 shows that the client receives the broadcast of meta-data from the server.

Process block 1311 shows that in one embodiment the client system then updates a meta-data table and a content rating table. Process block 1313 shows that in one embodiment, a user of the client system can optionally classify any one or more of the plurality of data files that are described by the meta-data. In one embodiment, the meta-data table and content rating table are updated by the client if there are user classifications. In one embodiment, the updates to the meta-data table and content rating table described in process blocks 1311 and 1313 are performed in a similar manner as described above with respect to for example FIGS. 1-12.

Process block 1315 shows that the client then sends the ratings of the data files to the server. In one embodiment, each client in the broadcast network sends the ratings for all of the plurality of data files that are described by the meta-data broadcast earlier from the server. In one embodiment, each client sends all or part of the content rating table maintained on the client system.

Process block 1317 shows that the server receives the ratings of the data files from the client(s) in the broadcast system. Process block 1319 shows that the server then selects the data files having the highest ratings as determined by the client systems. In one embodiment, the server includes processing to aggregate all of the ratings received from the clients. In one embodiment, the data files are sorted according to the aggregated ranking.

Process block 1319 shows that in one embodiment the server then selects of the data files in response to the rankings received from all the clients. In one embodiment, the data files that are to be broadcast are then determined in response to the ranking. As a result, one embodiment of a server in accordance with the teachings of the present invention broadcasts only the most appropriate or relevant data files for the customer base or clients. For instance, in one embodiment, only the data files having the highest ranking are broadcast and the data files having the lowest ranking are not broadcast. In one embodiment, the broadcast schedule is also determined in response to be ranking. For instance, in one embodiment, the highest ranked data files are broadcast before lower ranked data files. In another embodiment, the highest ranked data files are broadcast at a time assumed most appropriate to send highly ranked data files. For instance, assume an example where Thursday evenings during primetime is the most important time for a broadcaster to have the highest ratings for broadcast. In this example, a server in accordance with teachings of the present invention would broadcast the highest-ranking data file on Thursday evening during primetime. It is appreciated of course this example was given for explanation purposes only and that a server may determine a broadcast schedule in other ways in response to ratings received from the clients.

In one embodiment, the data files to broadcast and/or the broadcast schedule are determined dynamically by the server in response to the ratings received from the client(s) in accordance with teachings of the present invention. Therefore, in one embodiment, broadcast schedules can change over time depending on which data files are available from the server and which content or data files are accessed and/or classified by the clients.

Once the data files to be broadcast and the broadcast schedule are determined by the server, process block 1321 shows that the server then broadcasts the data file broadcast schedule to the clients. Process block 1323 shows that the client then receives the data file broadcast schedule from the server.

In one embodiment, the clients wake-up at the pre-specified time indicated in the data file broadcast schedule to receive the data files from the server. Process block 1325 shows that the data files are then actually broadcast from the server to the clients at the time specified in the data file broadcast schedule.

In one embodiment, process block 1327 shows that the client receives the broadcast of the data files from the server. In one embodiment, process block 1329 shows that the client selectively stores data files according to the content rating table. In another embodiment, the client selectively wakes up to selectively receive data files broadcast from the server according to the content rating table. In this embodiment, the client then stores the data files that were selectively received by the client according to the content rating table. In one embodiment, process block 1331 shows that the client then updates the meta-data table and content rating table if there any user accesses of the stored data files.

It is appreciated that the client system in the embodiment described in FIG. 13 is similar to the client systems described in previous embodiments with the exception of the client system sending ratings back to the server. It is appreciated that alternate embodiments of the client system may be utilized in accordance with the teachings of the present invention. In one embodiment, the client system does not include the client-side filtering of the data files that are broadcast from the server. However, the client system does receive the meta-data broadcasts from the server, rate the data files and send the ratings back to the server in accordance with teachings of present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
   broadcasting meta-data to a plurality of client systems, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

processing the meta-data at each of at least a portion of the plurality of client systems to generate an automatic content-rating interface at that client system via which content ratings corresponding to the specific pieces of broadcast programming content may be obtained;

obtaining the content ratings for the specific pieces of broadcast programming content via the automatic content-rating interface;

receiving the content ratings from the plurality of client systems; and automatically broadcasting a selected portion of the specific pieces of broadcast programming content to the plurality of client systems during the future broadcast, the selected portion of the specific pieces of broadcast programming content automatically selected in response to the content ratings received from the plurality of client systems, wherein the content ratings are automatically generated based on attribute relevance value and believability factor.

2. The method of claim 1 wherein the selected portion of the specific pieces of broadcast programming content that are broadcast are pieces of broadcast programming content having higher content ratings than a remaining portion of pieces of broadcast programming content that are not selected for broadcast.

3. The method of claim 1 further comprising broadcasting a broadcast schedule of the selected portion of the specific pieces of broadcast programming content prior to broadcasting the selected portion.

4. The method of claim 1 further comprising broadcasting a broadcast schedule of the meta-data prior to broadcasting the meta-data to the plurality of client systems.

5. The method of claim 1 wherein broadcasting the selected portion to the plurality of client systems comprises broadcasting one of the specific pieces of broadcast programming content having a higher rating prior to broadcasting one of the specific pieces of broadcast programming content having a lower rating.

6. A method, comprising:
   receiving, at a client system, meta-data broadcast by a broadcast system, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

obtaining automatically generated ratings via a content rating table for at least one of the specific pieces of broadcast programming content described by the meta-data, the content rating table generated using the meta-data and containing ratings derived from observation of pieces of broadcast programming content having similar descriptors and/or attributes to the descriptors and/or attributes included in the meta-data that have been previously accessed via the client system;

transmitting the ratings to the broadcast system; and automatically receiving a second plurality of pieces of broadcast programming content broadcast by the broadcast system during the future broadcast, the second plurality of pieces of broadcasting programming content including at least a portion of the specific pieces of broadcasting programming content, wherein the content ratings are automatically generated based on attribute relevance value and believability factor.

7. The method of claim 6 further comprising:
receiving a meta-data broadcast schedule broadcast by the broadcast system; and
activating the client system in response to the meta-data broadcast schedule to receive the meta-data when it is broadcast by the broadcast system.

8. The method of claim 6 further comprising storing, based on the content rating table, a portion of the second plurality of pieces of broadcast programming content broadcast by the broadcast system.

9. A method, comprising:
receiving, at a client system, meta-data broadcast by a broadcast system, the meta-data including titles of specific pieces of broadcast programming content being considered for future broadcast, but which have not yet been scheduled in a future broadcast, the meta-data further including sets of descriptors and/or attributes describing the specific pieces of broadcast programming content;
automatically rating, in response to a content rating table, at least one of the specific pieces of broadcast programming content described by the meta-data, the content rating table generated using the meta-data and containing ratings derived from observation of pieces of broadcast programming content having similar descriptors and/or attributes to the descriptors and/or attributes included in the meta-data that have been previously accessed via the client system;
transmitting the ratings to the server system;
receiving a broadcast schedule of a second plurality of pieces of broadcast programming content to be broadcast by the broadcast system during the future broadcast, the second plurality of pieces of broadcasting programming content including at least a portion of the specific pieces of broadcasting programming content; and
automatically receiving, based on the content rating table, a portion of the second plurality of pieces of broadcast programming content broadcast by the broadcast system during the future broadcast,
wherein the ratings are automatically generated based on attribute relevance value and believability factor.

10. The method of claim 9 further comprising:
receiving a meta-data broadcast schedule broadcast by the broadcast system; and
activating the client system in response to the meta-data broadcast schedule to receive the meta-data when it is broadcast by the broadcast system.

11. The method of claim 9 further comprising receiving a broadcast schedule of the second plurality of pieces of broadcast programming content prior to selectively receiving the portion of the second plurality of pieces of broadcast programming content.

12. The method of claim 9 further comprising storing the portion of the second plurality of pieces of broadcast programming content broadcast by the broadcast system.

13. An apparatus, comprising:
a processor having circuitry to execute instructions;
a communications interface coupled to the processor, the communications interface coupled to broadcast data to a plurality of client systems, the communications interface further coupled to receive data from the plurality of client systems;
a storage device coupled to the processor, having sequences of instructions stored therein, which when executed by the processor cause the processor to broadcast meta-data to the plurality of client systems, the meta-data including titles of specific pieces of broadcast programming content being considered for future broadcast, but which have not yet been scheduled in a future broadcast, the meta-data further including sets of descriptors and/or attributes describing the specific pieces of broadcast programming content;
receive automatically generated content ratings for the specific pieces of broadcast programming content from the plurality of client systems, the content ratings for each specific piece of broadcast programming content being identified by corresponding meta-data; and
automatically broadcast a selected portion of the specific pieces of broadcast programming content to the plurality of client systems during the future broadcast in response to the ratings received from the plurality of client systems,
wherein the content ratings are automatically generated based on attribute relevance value and believability factor.

14. The apparatus of claim 13 wherein the selected portion includes pieces of broadcast programming content having higher content ratings than a remaining portion of pieces of broadcast programming content that are not selected for broadcast.

15. The apparatus of claim 13 wherein the processor is further caused to broadcast a broadcast schedule of the portion of the specific pieces of broadcast programming content prior to broadcasting the portion of the specific pieces of broadcast programming content.

16. The apparatus of claim 13 wherein the processor is further caused to broadcast a broadcast schedule of the meta-data prior to broadcasting the meta-data to the plurality of client systems.

17. An apparatus, comprising:
a processor having circuitry to execute instructions;
a communications interface coupled to the processor, the communications interface coupled receive data broadcast from a broadcast system, the communications interface further coupled to transmit data to the broadcast system;
a storage device coupled to the processor, having sequences of instructions stored therein, which when executed by the processor cause the processor to receive meta-data broadcast by a broadcast system, the meta-data including titles of specific pieces of broadcast programming content being considered for future broadcast, but which have not yet been scheduled in a future broadcast, the meta-data further including sets of descriptors and/or attributes describing the specific pieces of broadcast programming content;
automatically rate, in response to a content rating table, at least one of the specific pieces of broadcast programming content described by the meta-data, the content rating table generated using the meta-data and containing ratings derived from observation of pieces of broadcast programming content having similar descriptors and/or attributes to the descriptors and/or attributes included in the meta-data that have been previously accessed via the apparatus;
transmit the ratings of the at least one of the specific pieces of broadcast programming content to the broadcast system;
automatically receive a second plurality of pieces of broadcast programming content broadcast by the broadcast system during the future broadcast, the second plurality of pieces of broadcasting programming content including at least a portion of the specific pieces of broadcasting programming content; and automatically store, based on the content rating table, one or more of the second plurality of pieces of broadcast programming content broadcast by the broadcast system, wherein the content ratings are automatically generated based on attribute relevance value and believability factor.

18. The apparatus of claim 17 wherein the processor is further caused to:

receive a meta-data broadcast schedule broadcast by the broadcast system; and activate the client system in response to the meta-data broadcast schedule to receive the meta-data when it is broadcast by the broadcast system.

19. An apparatus comprising:

a processor having circuitry to execute instructions;

a communications interface coupled to the processor, the communications interface coupled receive data broadcast from a broadcast system, the communications interface further coupled to transmit data to the broadcast system;

a storage device coupled to the processor, having sequences of instructions stored therein, which when executed by the processor cause the processor to receive meta-data broadcast by a broadcast system, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

automatically rate, in response to a content rating table, at least one of the specific pieces of broadcast programming content described by the meta-data, the content rating table generated using the meta-data and containing ratings derived from observation of pieces of broadcast programming content having similar descriptors and/or attributes to the descriptors and/or attributes included in the meta-data that have been previously accessed via the apparatus;

transmit the ratings to the broadcast system;

receive a broadcast schedule of a second plurality of pieces of broadcast programming content to be broadcast by the broadcast system during the future broadcast, the second plurality of pieces of broadcasting programming content including at least a portion of the specific pieces of broadcasting programming content;

automatically receive, based on the content rating table, a portion of the second plurality of pieces of broadcast programming content broadcast by the broadcast system; and automatically store the portion of the second plurality of pieces of broadcast programming content broadcast by the broadcast system, wherein the ratings are automatically generated based on attribute relevance value and believability factor.

20. The apparatus of claim 19 wherein the processor is further caused to:

receive a meta-data broadcast schedule broadcast by the broadcast system; and activate the client system in response to the meta-data broadcast schedule to receive the meta-data when it is broadcast by the broadcast system.

21. The apparatus of claim 19 wherein the processor is further caused to receive a broadcast schedule of the second plurality of pieces of broadcast programming content prior to selectively receiving the portion of the second plurality of pieces of broadcast programming content.

22. A tangible machine-readable storage medium having instructions stored thereon, which when executed by a processor cause the processor to broadcast meta-data to a plurality of client systems, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

receive automatically generated content ratings for the specific pieces of broadcast programming content from at least a portion of the plurality of client systems; and automatically broadcast a selected portion of the specific pieces of broadcast programming content to the plurality of client systems during the future broadcast in response to the ratings received from the one or more client systems, wherein the content ratings are automatically generated based on attribute relevance value and believability factor.

23. The tangible machine-readable storage medium of claim 22 wherein the selected portion of the specific pieces of broadcast programming content that are broadcast during the future broadcast are pieces of broadcast programming content having higher content ratings than a remaining portion of pieces of broadcast programming content that is not selected for broadcast.

24. A tangible machine-readable storage medium having instructions stored thereon, which when executed by a processor cause the processor to receive meta-data broadcast by a broadcast system, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

automatically rate, in response to a content rating table, at least one of the specific pieces of broadcast programming content described by the meta-data, the content rating table generated using the meta-data and containing ratings derived from observation of pieces of broadcast programming content having similar descriptors and/or attributes to the descriptors and/or attributes included in the meta-data that have been previously accessed via a client system containing the processor;

transmit the ratings to the broadcast system;

automatically receive a second plurality of pieces of broadcast programming content broadcast by the server system during the future broadcast, the second plurality of pieces of broadcasting programming content including at least a portion of the specific pieces of broadcasting programming content; and automatically store, based on the content rating table, one or more of the second plurality of pieces of broadcast programming content broadcast by the broadcast system, wherein the ratings are automatically generated based on attribute relevance value and believability factor.

25. The tangible machine-readable storage medium of claim 24 wherein the processor is further caused to:

receive a meta-data broadcast schedule broadcast by the broadcast system; and activate a client system containing the processor in response to the meta-data broadcast schedule to receive the meta-data when it is broadcast by the broadcast system.

26. A system, comprising:

a broadcast system; and one or more client systems coupled to the broadcast system;

wherein the broadcast system is coupled to broadcast meta-data to a plurality of client systems, the meta-data including titles of specific pieces of broadcast programming content being considered for future broadcast, but which have not yet been scheduled in a future broadcast, the meta-data further including sets of descriptors and/or attributes describing the specific pieces of broadcast programming content;

wherein the plurality of client systems are coupled to rate in response to a content rating table one or more of the specific pieces of broadcast programming content described by the meta-data, the content rating table generated using the meta-data and containing automatically generated ratings derived from observation of pieces of broadcast programming content having similar descriptors and/or attributes to the descriptors and/or attributes included in the meta-data that have been previously accessed via that client system;

wherein the one or more client systems are coupled to transmit to the broadcast system the ratings;

wherein the broadcast system is coupled to automatically select a portion of the specific pieces of broadcast programming content in response to the ratings received from the plurality of client systems;

wherein the broadcast system is further coupled to automatically broadcast the selected portion of the specific pieces of broadcast programming content, and wherein the ratings are automatically generated based on attribute relevance value and believability factor.

27. The system of claim 26 wherein each one of the plurality of client systems is coupled to selectively store a portion of the selected portion of the specific pieces of broadcast programming content in response to a content rating table associated with each respective one of the plurality of client systems.

28. The system of claim 26 wherein each one of the plurality of client systems is coupled to selectively receive a portion of the selected portion of the specific pieces of broadcast programming content in response to a content rating table associated with each respective one of the plurality of client systems.

* * * * *